United States Patent [19]

Jordan et al.

[11] Patent Number: 5,157,269

[45] Date of Patent: Oct. 20, 1992

[54] LOAD CURRENT SHARING CIRCUIT

[75] Inventors: Mark Jordan, Manchester, N.H.; Robert A. Mammano, Costa Mesa, Calif.

[73] Assignee: Unitrode Corporation, Lexington, Mass.

[21] Appl. No.: 648,569

[22] Filed: Jan. 31, 1991

[51] Int. Cl.⁵ .............................................. H02J 1/10
[52] U.S. Cl. ..................................... 307/59; 307/53; 307/31; 363/72
[58] Field of Search ................. 307/19, 20, 24, 43–45, 307/53, 59, 60, 62, 57, 58, 31, 32, 35; 323/268–272; 363/65, 71, 72

[56] References Cited

U.S. PATENT DOCUMENTS

| 4,164,661 | 8/1979 | Hucker et al. | 307/57 |
|---|---|---|---|
| 4,177,389 | 12/1979 | Schott | 307/64 |
| 4,356,403 | 10/1982 | Mohat | 307/60 |
| 4,476,399 | 10/1984 | Yoshida et al. | 307/44 |
| 4,618,779 | 10/1986 | Wiscombe | 307/60 |
| 4,628,433 | 12/1986 | Notohamiprodjo | 323/272 X |
| 4,635,178 | 1/1987 | Greenhalgh | 307/58 X |
| 4,698,738 | 10/1987 | Miller et al. | 307/58 X |
| 4,748,340 | 5/1988 | Schmidt | 307/53 |
| 4,766,364 | 8/1988 | Biamonte et al. | 323/272 |
| 4,866,295 | 9/1989 | Leventis et al. | 307/43 |
| 4,877,972 | 10/1989 | Sobhani et al. | 307/43 |
| 4,920,309 | 4/1990 | Szepesi | 323/269 |
| 4,924,170 | 5/1990 | Henze | 323/272 |

Primary Examiner—A. D. Pellinen
Assistant Examiner—Fritz M. Fleming
Attorney, Agent, or Firm—Weingarten, Schurgin, Gagnebin & Hayes

[57] ABSTRACT

A load current sharing circuit is disclosed that allows multiple independent power modules, either switching or linear, to be connected in a parallel configuration such that each module delivers only its proportionate share of the load current. Each module measures the common output voltage, compares that voltage to an internal reference voltage signal, and generates an error voltage signal to be used as feedback for regulating its output voltage. The internal reference voltage signal is a function of the extent to which the current within each module differs from the current of the module with the highest current. That module functions as the master, and all the other modules act as slaves. Each slave increases its share of the load current so as to asymptotically approach the load current of the master to within a preset offset voltage, while the load current of the master decreases.

5 Claims, 4 Drawing Sheets

LOAD CURRENT SHARING CIRCUIT

FIELD OF THE INVENTION

This invention relates to power supplies, and in particular to power supplies with multiple paralleled power modules.

BACKGROUND OF THE INVENTION

When a plurality of normally independent power modules are connected in a parallel configuration, one of the power modules typically supplies almost all of the load current, leaving the rest of the modules poorly utilized, resulting in uneven distribution of electrical and thermal stress, and consequent decrease in the life of the entire power supply. For example, consider a case wherein two power modules are connected together in parallel to drive a single load. A first module with a higher output voltage than a second module will supply all the current to the load so long as the demand for current does not exceed the maximum current capacity of the first module. The second module will provide current only when the load overwhelms the capacity of the first module, causing the output voltage of the first module to drop. The result is severely unbalanced sharing of the load current between the two modules.

In a power supply with multiple paralleled power modules, it is known to include circuitry for equally distributing a load current among a plurality of power modules. This technique is referred to as "load sharing". Load sharing is typically found in power supplies wherein more than one power module services a single load or a common point on a power bus which then supplies multiple loads.

A known method for current sharing is referred to as the "master-slave" approach wherein a preselected master supply controls all the other supplies, called slaves. Each slave supply delivers an equal share of the total load current. However, if the master fails, the entire system becomes disabled, defeating the purpose of a redundant supply.

Another method for current sharing employs an external load sharing module. A cable from each power module is connected to the load sharing module, and a single pair of cables connect the load sharing module to a supply bus. Control circuitry within the load sharing module feeds back to the power modules to insure load balancing. The load sharing module is built to accommodate a fixed number of power modules. If additional modules need to be added to the system, the load sharing module must be modified or replaced.

Yet another method for implementing current sharing is referred to as "current averaging", as exemplified in U.S. Pat. No. 4,717,833. With this approach, each power supply module drives a common share bus via a resistor. If each supply is sourcing the same amount of load current, then each will drive the common bus with the same voltage, resulting in negligible current flow through each resistor driving the common bus. A differential measurement of the bus resistance determines the extent to which a reference signal is adjusted. A problem arises with this method when relatively low capacity supplies are used in conjunction with relatively higher capacity supplies. This problem occurs when there is one module that, although operational, cannot source its required share of the load current. In this case, the bus is dragged down, and the reference adjust circuitry within each of the other modules on the bus clamps to the low value. This results in an undesirable change in output voltage along with unequal current distribution among the supplies.

SUMMARY OF THE INVENTION

A load current sharing circuit is disclosed that allows multiple independent power modules, either switching or linear, to be connected in a parallel configuration such that each module delivers only its proportionate share of the load current. Each module measures the common output voltage, compares it to an internal reference voltage signal, and generates an error voltage signal to be used as feedback for increasing that module's output voltage. The internal reference voltage signal is a function of the extent to which the current within each module differs from current of the module with the highest current. This highest current module functions as the master, and all the other modules act as slaves. Each slave increases its share of the load current so as to asymptotically approach the load current of the master to within a preset offset voltage, while the share of the load current of the master decreases. Any module can become the master in accordance with whatever module is forcing the highest output current.

Current measurement signals are carried on a common current share bus of low-bandwidth which is very insensitive to noise. The current share bus is configured so that when a module fails, the failing module does not load down the bus, and the other modules proportionately increase their current to compensate for the increased demand for current due to the disabled module. If the share bus becomes shorted to ground, each module continues to operate, albeit in an independent manner, i.e., without load current sharing. If the master should fail, the module with the highest current among the remaining modules becomes the master.

The load current sharing circuit of the invention resides on the output side of each power module within a multi-parallel module power supply, and drives its respective power controller either directly or through an isolation device, such as an optocoupler.

The invention can work with either voltage controlled current mode or conventional voltage mode power supplies, and can be added to any supply, such as a linear regulating power supply or a magnetic amplifier regulating supply. The invention allows a given power supply to be used alone or in a parallel configuration with one or more other power supplies without additional hardware. The invention includes a paralleling wire that is immune to noise pickup, as well as a high impedance ground sense line from the load to improve accuracy of the output voltage. The invention allows each power module to function independently if the paralleling wire is shorted, or otherwise disabled. Furthermore, the invention allows modules of low current capacity to cooperate with modules of relatively greater current capacity.

DESCRIPTION OF THE DRAWING

The invention will be more fully understood from the following detailed description, in conjunction with the accompanying figures, in which.

DETAILED DESCRIPTION OF THE INVENTION

The load sharing circuit of the invention provides load current sharing among multiple independent power modules connected in a parallel configuration such that each module delivers a substantially equal portion of the load current, wherein the failure of any one module is compensated for by the remaining modules.

Figure 1:
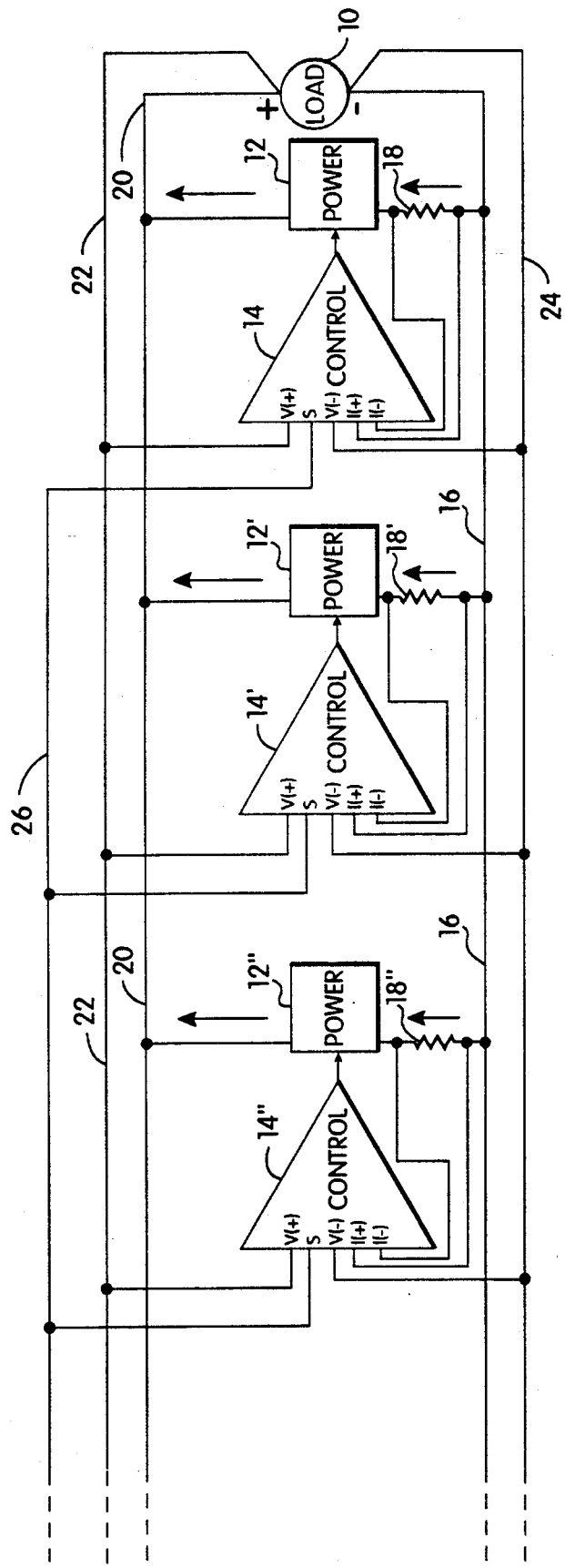
FIG. 1 is a block diagram of a power supply that includes a load sharing circuit of the invention for each module connected in parallel to a load.

Referring to FIG. 1, a load 10 is driven by a plurality of power modules 12 connected in mutually parallel relationship. Each power module 12 is controlled by a power control unit 14 that includes the load sharing circuit of the invention in cooperation with power control circuitry to be described below. Each power module 12 is connected to a power return line 16 via a resistor 18 for sensing current, and to a power supply line 20. Each power control unit 14 is connected across the resistor 18 to measure a voltage drop commensurate with the load current of each corresponding power module 12. To measure the voltage applied to the load 10, each power control unit 14 also is connected in parallel across the load 10 via the (+) sense line 22 and the (−) sense line 24, both lines being of high impedance. Also, each power control unit 14 is connected to a share bus 26 operative to carry information regarding the current flowing through the module 12 that measures the greatest current, designated as the master. All other modules 12 are referred to as slaves, because their respective power control units 14 are responsive to the value of the greatest current provided by the share bus 26, and modify their output current so as to reduce the disparity between their respective currents and that of the prevailing master.

Figure 2:
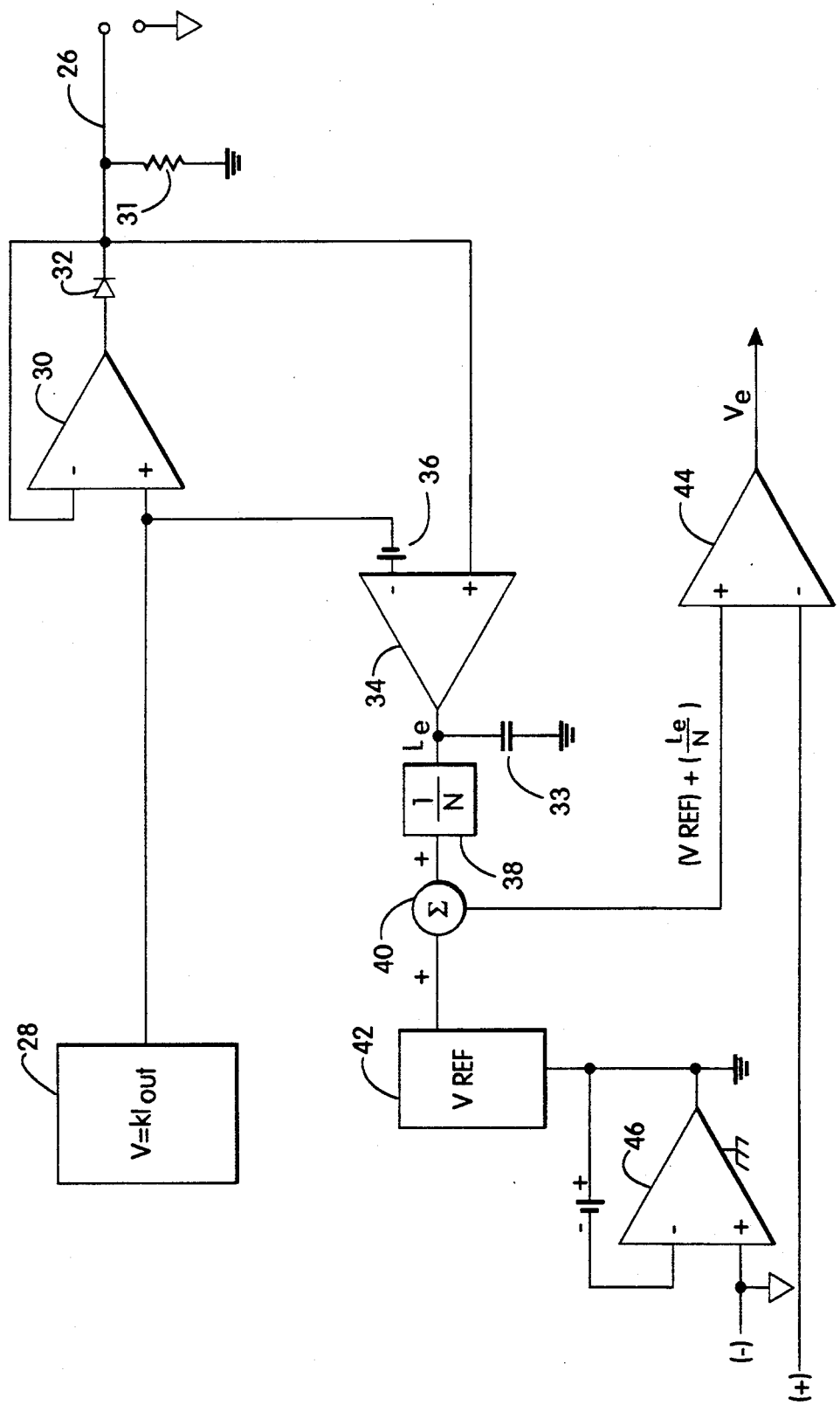
FIG. 2 is a schematic diagram of the primary elements of an embodiment of the load sharing circuit of the invention.

Referring to FIG. 2, the basic operation of the load sharing circuit of the invention will now be discussed. A current monitor 28 measures the output current flowing through its associated power module, and provides a voltage representation of that current to the noninverting input of a buffer amp 30 according to the relation $V = kI_{out}$. The constant k is proportional to the resistance of the resistor 18 of FIG. 1, and to the gain of the current sense amplifier 52 of FIG. 3 within the current monitor 28, by a factor of, for example, twenty. The buffer amp 30 in cooperation with the diode 32 constitute a unidirectional bus driver that behaves like an ideal diode, i.e., current can only flow towards the share bus 26. The buffer amp 30 compares the voltage on the share bus 26 with the voltage provided by the current monitor 28. If the voltage on the share bus 26 is greater than the voltage from the current monitor 28, the buffer amp 30 does not conduct current, and is effectively disabled. A resistor 31, for example a 10 k ohm resistor, provides an impedance when the buffer amp 30 is disabled. There is only one module 12 with the highest current, and so only one buffer amp 30 will not be disabled; this module is the master, and all the rest are the slaves.

The output of the current monitor 28 is connected to the inverting input of an adjust amp 34 via a potential source 36, the source 36 being included to provide a voltage offset that insures that the current of each slave module never exceeds the current of the reigning master. The noninverting input of the adjust amp 34 is connected to the share bus 26. The adjust amp 34 compares the voltage provided by the current monitor with the voltage of the share bus which represents the current of the master, and provides a signal that is commensurate with the disparity between its input voltages. A compensation capacitor 33 is used to limit the bandwidth of the current share loop. The output signal $L_e$ of the adjust amp 34 is diminished by a factor of N by a divider 38, where N in the preferred embodiment is 17.5. The output of the divider 38 $L_e/N$ is added by an adder 40 to a signal Vref provided by a voltage reference 42. The signal $Vref + L_e/N$ is provided to the noninverting input of a voltage amp 44. The voltage amp 44 also receives, at its inverting input, a feedback signal from the load 10 via the (+) sense line 22, and provides an error voltage signal $V_e$ that increases the output voltage of the associated module 12, in a manner that will be explained below. Therefore, an insufficiency in current that is detected by the current monitor 28 will result in an increase in the output voltage of the associated module.

The inverting input to the voltage amp 44 is of high impedance, as is the noninverting input of the ground amp 46. Thus, the output voltage of the power supply as measured at the load 10 is sensed differentially and at high impedance. One advantage of including high impedance inputs is that errors due to voltage drops in the sensing lines are diminished.

Figure 3:
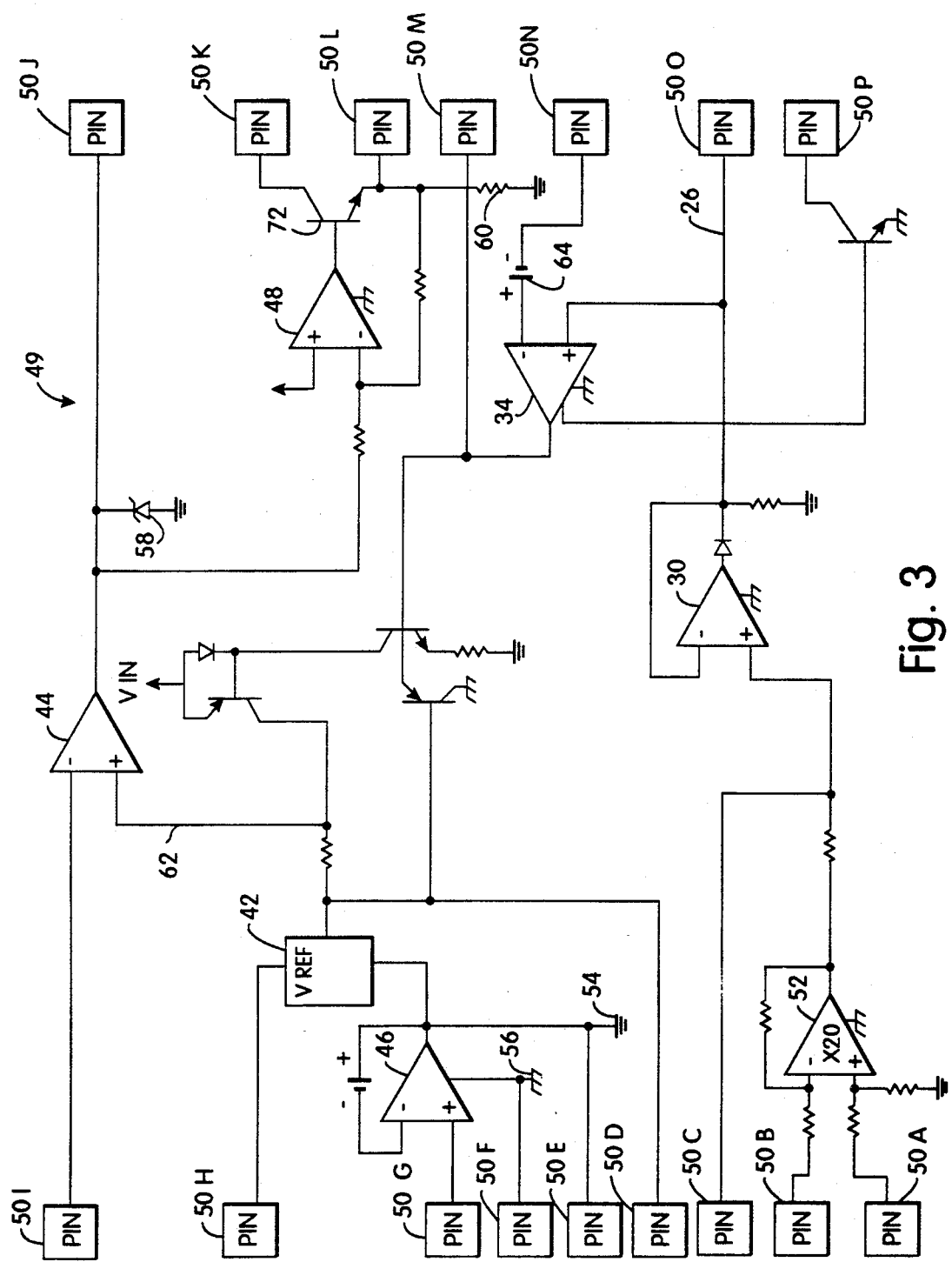
FIG. 3 is a schematic diagram of the primary elements of the embodiment of FIG. 2 adapted for inclusion on an integrated circuit chip, including pinouts.

With reference to FIG. 3, a preferred integrated circuit implementation 49 of the major elements of the circuit of the invention is shown, including a preferred pinout configuration. All gain and level setting resistors to be used in conjunction with the pins 50 and supplementary compensation networks are not included on-chip. One skilled in the art nevertheless could include these support devices in a design that embodied the invention, perhaps thereby reducing the pinout to 8 pins to provide enhanced customer convenience. However, not including them provides enhanced versatility. An 8-pin version of the invention is useful for low-power applications, wherein gains are fixed and the ground amplifier 46 is not included.

Discussing the components of the circuit of the invention in greater detail, the reference circuit 42 employs a band-gap circuit that is set at 2.0 volts with respect to the noninverting input of the ground amplifier 46 (1.75 V above an artificial ground 13), and is internally trimmed to 1.25% accuracy. The reference circuit 42, as well as the operational amplifiers 30, 34, 42, 44, 46, 48, and 52, are adapted to operate using a supply voltage that varies over a range of 4.5 to 35 volts, allowing operation from unregulated DC, an auxiliary voltage, or the same output voltage that it is controlling. Under-voltage lockout has been included to insure proper start-up by disabling internal bias currents until the reference module rises into regulation mode. In this embodiment, a 2.0 volt output was selected to accommodate the variations in voltage commonly found in a 5 volt supply Vcc.

The circuit of the invention includes three different grounds. The noninverting input of the ground amplifier 46 is a high impedance input intended to allow remote sensing of the system ground, a ground that is common to all modules included in the power supply, and to the load 10. Any voltage drops which might appear in the power return line 16 are bypassed. This input is the "true" ground. The ground 54 is a low impedance circuit ground that is substantially 250 millivolts above the noninverting input of the ground amplifier 46. The offset of 250 millivolts allows the ground amplifier 46 negative headroom to return all the control bias and operating currents while maintaining a high impedance at the noninverting input of the amplifier 46. The ground return 56 is the most negative voltage available to the chip, and can range from 0 to −5V below the noninverting input of the amplifier 46. The return line 56 is preferably connected as close to the power source as possible so that voltage drops across the power return line 56 and current sensing impedances lie between this line 56 and the noninverting input of the amplifier 46.

A voltage amplifier 44 serves as a feedback control amplifier to provide output voltage regulation for its associated power module. Overall loop compensation is provided by external components 66, 68, 70 operating in conjunction with the amplifier 44. The output of the amplifier 44 ranges from slightly above the ground return 56 to a maximum voltage of 2 volts enforced by a zener diode 58 serving as a clamp and connected to the output of the amplifier 44.

A drive amplifier 48 introduces a gain of −2.5 between pins 50J and 50L. The amplifier 48 is usually configured with a current setting resistor 60 to ground that establishes a current-sinking output optimized to drive an optical coupler biased at a voltage ranging from 4.5V to 35V, with current levels up to 20mA. The drive amplifier 48 serves as a voltage-to-current converter for optimally driving an optocoupler. The polarity of the amplifier 48 is such that an increasing error voltage at the output of the voltage amplifier 44 will decrease the optocoupler's current. In a non-isolated application, i.e., without use of an optocoupler, a voltage signal ranging from 0.25V to 4.1V can be taken from the current-setting output. Note, however, that this voltage signal also increases with increasing sense voltage, necessitating an external invertor to achieve suitable feedback polarity.

A current amplifier 52 is provided that has differential sensing capability, for use with an external resistive shunt 18 in the power return line 16. The common-mode range of the current amplifier's input will accommodate the full range spanning the power return point and Vcc=2V, allowing undefined line impedances on either side of the resistive shunt 18. The gain of the amplifier 52 is internally set at 20, but its bandwidth is externally controllable, preferably by the addition of a capacitor at its output.

The output of the current amplifier 52 is connected to the noninverting input of a buffer amplifier 30. The buffer amplifier 30 is a unidirectional buffer which drives the current share bus 26, a bus to which all modules in the power supply are connected. The amplifier 30 insures that the module with the highest output current becomes the master, since the amplifier 30 only sources current. All other buffer amplifiers within the other respective modules are inactive, each exhibiting a 10 k Ohm load impedance to ground.

An adjust amplifier 34 adjusts the module's reference voltage signal 62 so as to maintain equal current sharing among all the modules in the power supply. The amplifier 34 compares its own output to the signal on the current share bus 26. This signal represents the output current of the master, i.e., the highest output current of any of the modules within the power supply. The output of the amplifier 34 causes an increase in the reference voltage signal 62 that is received by the voltage amplifier 44 by as much as 100 mV. The particular voltage level of 100 mV arises due to the 17.5 to 1 internal resistor ratio between the adjust amplifier's clamped output and the reference circuit 42, and represents a 5% total range of adjustment, which is adequate to compensate for unit-to-unit reference circuit variations and external resistor tolerances. The inverting input of the adjust amplifier 34 is connected to a 50 mV offset 64 which forces the module acting as the master to have a low output, thereby insuring that the reference circuit will not change the reference signal 62 that it provides to the voltage amplifier 44. Although the 50 mV offset represents an error in current sharing, the gain of the current amplifier 52 reduces the error to only 2.5 mV across the resistive shunt 18. Also, the reference voltage provided by the reference circuit 42 will remain unchanged at the voltage amplifier's non-inverting input when either the module is not connected to the current share bus 26, or when the current share bus is shorted to ground. Thus, the other modules will take on additional responsibility to compensate for the inherent limited capacity, malfunction, or absence of any other module.

Figure 4:
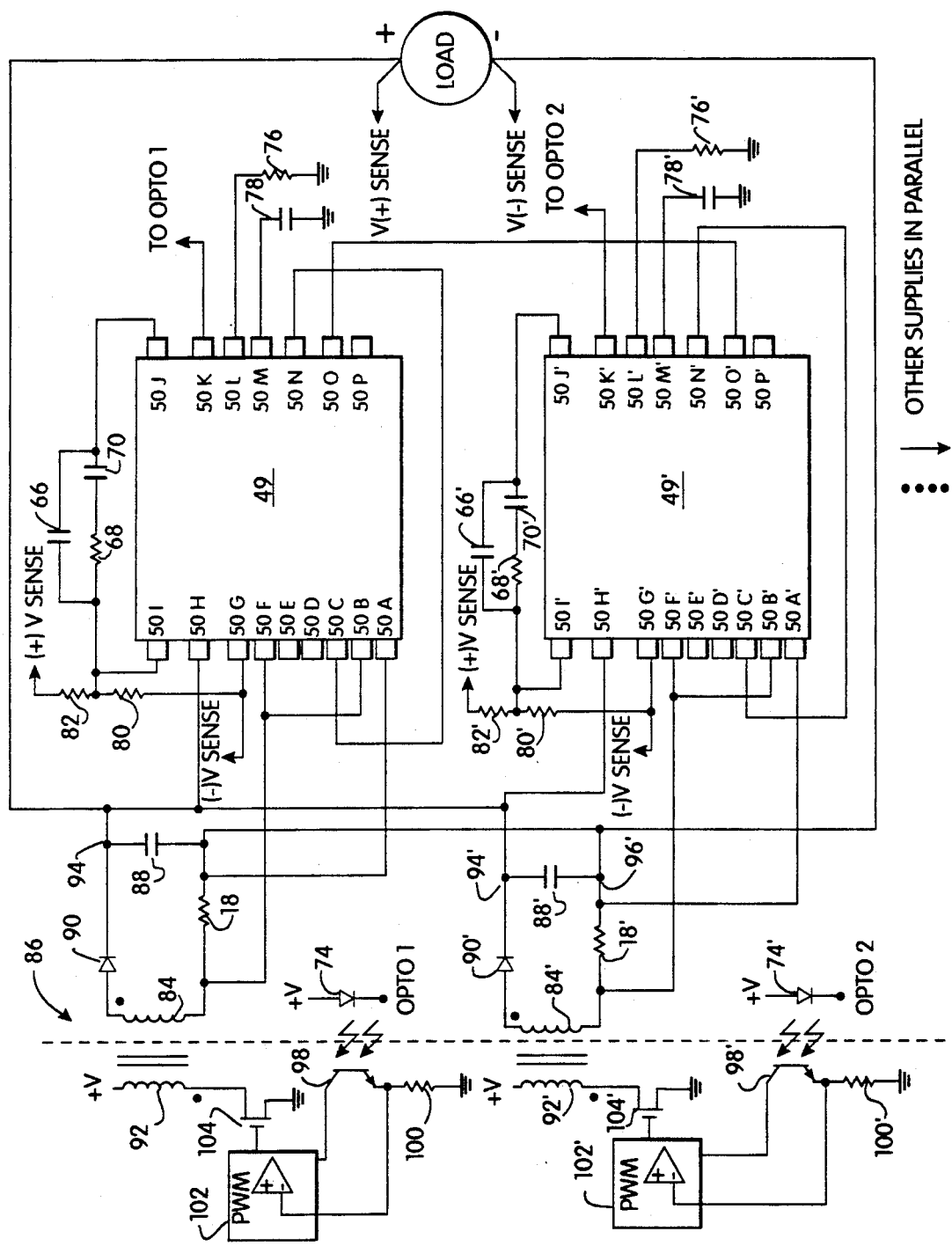
FIG. 4 is a schematic diagram illustrating how the embodiment of FIG. 3 is connected to supporting circuitry to provide a working device.

FIG. 4 illustrates a preferred embodiment wherein a plurality of integrated circuit implementations shown in FIG. 3 is connected in a parallel configuration as shown in FIG. 1. The inverting input of the voltage amp 44 is connected to the output of the voltage amp 44 via a capacitor in parallel with the series combination of a resistor 68 and a capacitor 70. The pin 50K connected to the drive amp 48 via the transistor 72 is connected to a light emitting diode 74 that serves to convert a current signal to a light signal. The pins 50L and 50M are connected to ground via a resistor 76 and a capacitor 78, respectively. The output of the current amp 52 at pin 50N is connected to the inverting input of the adjust amp 34 at pin 50C. The output of the buffer amp 30 at pin 50O is connected to the share bus 26. The resistive shunt 18 is connected across pins 50A and 50F, and pin 50F is connected to pin 50B. Pin 50G is connected to the (−) sense line 24, as well as being connected, via a series of resistors 80 and 82, to the (+) sense line 22, wherein pin 50I is connected between resistors 80 and 82. Pin 50H is connected to the load 10 on its positive side. A secondary coil 84 of a transformer 86 is connected in parallel with a capacitor 88 via a diode 90 and the resistive shunt 18, respectively. The subcircuit that contains the secondary coil 84, the diode 90, the capacitor 88, and the resistive shunt 18, is responsive to the primary coil 92, and serves to convert changes in pulse width into a desired output voltage between circuit nodes 94 and 96; the load 10 is connected across nodes 94 and 96. The desired output voltage is attained when a change in current applied to the LED 74 causes a change in light transmitted to a photocell 98. The resistor 100 converts a change in current through the photocell 98 to a voltage difference that is then converted to a change in pulse width by a pulse width modulator (PWM) 102. The PWM gates a MOSFET 104 that controls the current driven through the primary coil 92 of the transformer 86. Thus, it has been shown how a change in current as sensed by the current amp 52 effects a change in the voltage applied between circuit nodes 94 and 96 which drive the load 10.

Other modifications and implementations will occur to those skilled in the art without departing from the spirit and the scope of the invention as claimed. Accordingly, the above description is not intended to limit the invention except as indicated in the following claims.

What is claimed is:

1. Apparatus for promoting enhanced distribution of load current among a plurality of power modules that together constitute a parallel power supply for driving a load, the apparatus allowing each power module to function independently if the apparatus should become disabled in any way, and also allowing modules of low current capacity to cooperate with modules of relatively greater current capacity, the apparatus comprising:

a current monitor, connected to each power module, for providing a signal in accordance with the value of an electrical current flowing through each power module;

an ideal diode, responsive to the current monitor, for electing a master power module with the greatest electrical current flowing through it, and for providing a signal representative of information regarding the value of the greatest electrical current;

a share bus, responsive to the ideal diode, for communicating the signal with information regarding the value of the greatest electrical current among the plurality of power modules;

an adjusting amplifier with offset, responsive to the current monitor and the share bus, for providing an adjust signal;

a divider, responsive to the adjust signal, for providing a divided adjust signal;

a voltage reference for providing a constant reference voltage signal;

a ground amplifier with offset, connected to the voltage reference and responsive to a first signal representing a voltage applied to the load, for providing a high impedance terminal responsive to a system ground;

a summer, responsive to the voltage reference and the divider, for adding the divided adjust signal and the constant reference voltage signal, and for providing a voltage control signal; and an error signal amplifier, responsive to the summer and to a second signal representing a voltage applied to the load, for providing an error signal for reducing the disparity between the greatest electrical current the electrical current flowing through each module other than the power module with the greatest electrical current.

2. The apparatus of claim 1 wherein an input of the ground amplifier is of high impedance.

3. The apparatus of claim 1 wherein an input of the error signal amplifier is of high impedance.

4. The apparatus of claim 1 wherein the current monitor includes:

an differential amplifier with an inverting input, a noninverting input, and an output; and a resistive shunt connected between the inverting input and the noninverting input.

5. The apparatus of claim 1 wherein the ideal diode includes a diode and an operational amplifier.

* * * * *